United States Patent
Kim et al.

(10) Patent No.: US 11,936,580 B2
(45) Date of Patent: Mar. 19, 2024

(54) UPLINK OFDMA PROCESSING IN WLANS

(71) Applicant: Apple Inc., Cupertino, CA (US)

(72) Inventors: Joonsuk Kim, Saratoga, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/566,005

(22) Filed: Dec. 30, 2021

(65) Prior Publication Data

US 2022/0123895 A1 Apr. 21, 2022

Related U.S. Application Data

(63) Continuation of application No. 16/820,408, filed on Mar. 16, 2020, now Pat. No. 11,258,561, which is a continuation of application No. 16/008,880, filed on Jun. 14, 2018, now Pat. No. 10,601,562, which is a continuation of application No. 14/989,945, filed on Jan. 7, 2016, now Pat. No. 10,027,455.

(60) Provisional application No. 62/101,913, filed on Jan. 9, 2015.

(51) Int. Cl.
| | |
|---|---|
| *H04L 5/00* | (2006.01) |
| *H04L 1/12* | (2006.01) |
| *H04L 1/1829* | (2023.01) |
| *H04L 27/26* | (2006.01) |
| *H04W 56/00* | (2009.01) |
| *H04L 25/02* | (2006.01) |
| *H04W 84/12* | (2009.01) |

(52) U.S. Cl.
CPC ............... *H04L 5/0048* (2013.01); *H04L 1/12* (2013.01); *H04L 1/1854* (2013.01); *H04L 27/2656* (2013.01); *H04L 27/2657* (2013.01); *H04L 27/2675* (2013.01); *H04W 56/002* (2013.01); *H04L 5/0023* (2013.01); *H04L 25/0202* (2013.01); *H04W 84/12* (2013.01)

(58) Field of Classification Search
CPC .......... H04W 72/042; H04W 72/0453; H04W 74/0808; H04W 56/002; H04L 5/0007; H04L 25/0202
See application file for complete search history.

(56) References Cited

U.S. PATENT DOCUMENTS

| | | | |
|---|---|---|---|
| 7,693,111 B2 | 4/2010 | Sondur et al. | |
| 8,498,359 B2 | 7/2013 | Lauer et al. | |
| 10,027,455 B2 | 7/2018 | Kim et al. | |
| 10,601,562 B2 | 3/2020 | Kim et al. | |
| 2005/0169261 A1 | 8/2005 | Williams et al. | |
| 2006/0116080 A1 | 6/2006 | Eom | |
| 2008/0080472 A1* | 4/2008 | Bertrand | H04J 11/005 370/344 |

(Continued)

*Primary Examiner* — Jamal Javaid
(74) *Attorney, Agent, or Firm* — Kowert, Hood, Munyon, Rankin & Goetzel, P.C.

(57) ABSTRACT

This disclosure relates to orthogonal frequency division multiple access (OFDMA) communication in wireless local area networks (WLANs). According to some embodiments, a downlink OFDMA frame may be transmitted. An uplink OFDMA frame including acknowledgements associated with the downlink OFDMA frame may be received. The uplink OFDMA frame may be processed, in some instances including determining which devices receiving the downlink OFDMA frame transmitted an acknowledgement associated with the downlink OFDMA frame in the uplink OFDMA frame.

17 Claims, 12 Drawing Sheets

(56) References Cited

U.S. PATENT DOCUMENTS

| | | | |
|---|---|---|---|
| 2008/0176575 A1* | 7/2008 | Sutton | H04L 5/0007 |
| | | | 455/450 |
| 2009/0129317 A1 | 5/2009 | Che et al. | |
| 2010/0017675 A1 | 1/2010 | Ihm et al. | |
| 2010/0260114 A1 | 10/2010 | Vermani et al. | |
| 2011/0194644 A1 | 8/2011 | Liu et al. | |
| 2011/0261732 A1* | 10/2011 | Tanno | H04W 16/14 |
| | | | 370/281 |
| 2011/0280202 A1* | 11/2011 | Lee | H04L 5/003 |
| | | | 370/329 |
| 2014/0086112 A1* | 3/2014 | Stern-Berkowitz | H04L 5/14 |
| | | | 370/280 |
| 2014/0119300 A1* | 5/2014 | Aboul-Magd | H04J 11/0053 |
| | | | 370/329 |
| 2014/0328313 A1 | 11/2014 | Merlin et al. | |
| 2014/0369276 A1 | 12/2014 | Porat et al. | |

\* cited by examiner

UPLINK OFDMA PROCESSING IN WLANS

PRIORITY INFORMATION

This application is a continuation of U.S. patent application Ser. No. 16/820,408, entitled "Uplink OFDMA Processing in WLANs," filed Mar. 16, 2020, which is a continuation of U.S. patent application Ser. No. 16/008,880, entitled "Uplink OFDMA Processing in WLANs," filed Jun. 14, 2018, now U.S. Pat. No. 10,601,562, which is a continuation of U.S. patent application Ser. No. 14/989,945, entitled "Uplink OFDMA Processing in WLANs," filed Jan. 7, 2016, now U.S. Pat. No. 10,027,455, which claims priority to U.S. provisional patent application Ser. No. 62/101,913, entitled "OFDMA Communication in WLANs," filed Jan. 9, 2015, and which are all hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication systems, including orthogonal frequency division multiple access (OFDMA) communication in wireless local area networks (WLANs).

DESCRIPTION OF THE RELATED ART

Wireless communication systems are rapidly growing in usage. For example, wireless local area network (WLAN) accessibility is expected in most communication devices. WLANs are also increasingly being used to offload communication from cellular networks and/or base stations. In view of the expected continued increase in WLAN deployment and usage, existing WLAN communication techniques may provide insufficient capacity and flexibility relative to demand. Accordingly, improvements in the field are desired.

SUMMARY

Embodiments described herein relate to devices, systems, and methods for orthogonal frequency division multiple access (OFDMA) communication in WLANs.

According to the techniques presented herein, it may be possible for multiple wireless devices to perform WLAN communication using OFDMA techniques. As one such possibility, it may be possible to perform uplink OFDMA communication, e.g., at least for acknowledgments to a downlink OFDMA frame. For example, a downlink OFDMA frame structure may be configured such that the packet lengths provided to each recipient of the OFDMA frame are equal (e.g., by padding payloads of some of the packets as needed to obtain matching packet lengths). Transmission of acknowledgements by those recipients back to the original transmitting device may as a result be sufficiently synchronized in time as to enable concurrent reception of those acknowledgements. The acknowledgements may further be coordinated to be transmitted on the same bandwidth portions allocated for the downlink communication being acknowledged. Under such circumstances, the acknowledgement transmissions may have the same (or sufficiently similar) spectral mask as the downlink OFDMA frame being acknowledged and may effectively form an uplink OFDMA frame.

The techniques described herein may be implemented in and/or used with a number of different types of devices, including but not limited to access points, cellular base stations, smart phones, tablet computers, wearable computing devices, media players, set-top boxes, and any of various other computing devices capable of wireless communication.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
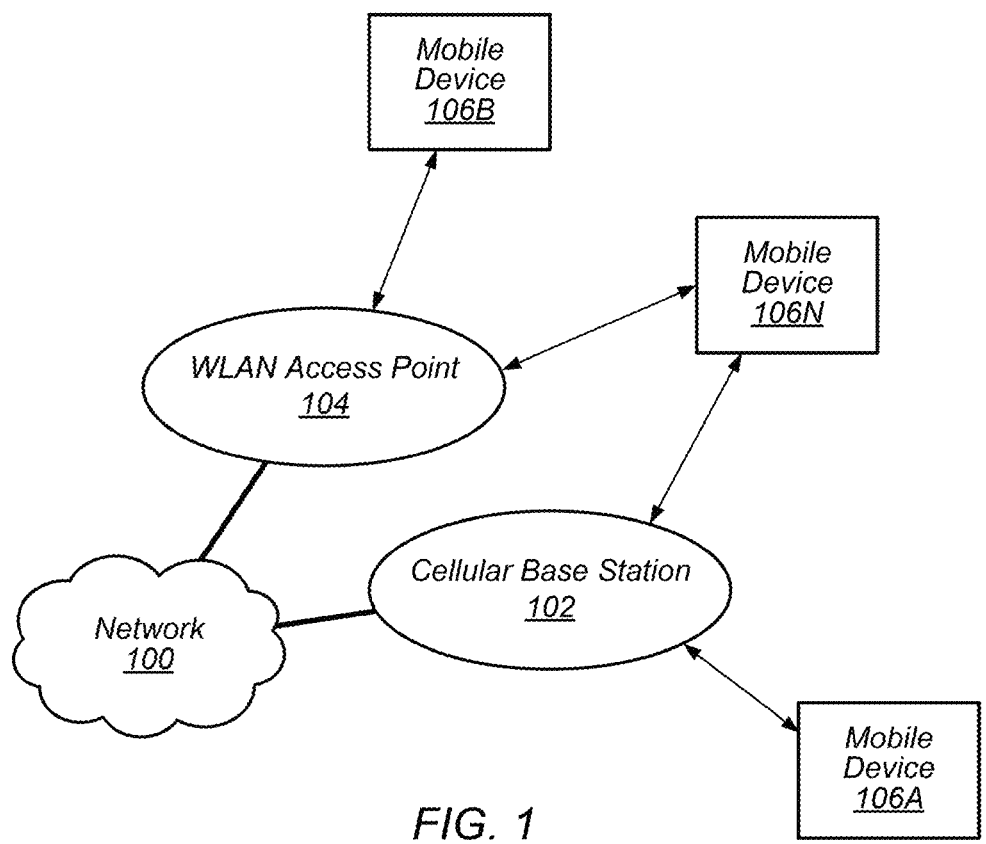
FIG. 1 illustrates an example (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
BS: Base Station
AP: Access Point
APN: Access Point Name
LTE: Long Term Evolution
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Signaling Gateway
ePDG: evolved Packet Data Gateway
GPRS: General Packet Radio Service

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as WLAN. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

WLAN—The term "WLAN" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 20 MHz wide while a smaller bandwidth may be operated by populating a portion of the frequency tones within a 20 MHz mask. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the example wireless communication system includes a cellular base station 102 that may communicate over a transmission medium with one or more mobile devices 106A, 106N. Each of the mobile devices may be, for example, a "user equipment" (UE) or other of various types of devices capable of wireless communication.

The base station 102 may be a base transceiver station (BTS) or cell site, and may include hardware that enables wireless cellular communication with any or all of the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), WLAN, WiMAX etc. A typical wireless cellular communication system will include a plurality of cellular base stations which provide different coverage areas or cells, with handoffs between cells.

Additionally, the example wireless communication system may include one or more wireless access points (such as access point 104) that may be communicatively coupled to the network 100. Each wireless access point 104 may provide a wireless local area network (WLAN) for communication with any or all of mobile devices 106 (e.g., UE 106B, as shown). These wireless access points may comprise WLAN access points. Wireless access point 104 may be configured to support cellular network offloading and/or otherwise provide wireless communication services as part of the wireless communication system illustrated in FIG. 1.

1) Cellular base station 102 and other similar base stations and 2) access points (such as access point 104) operating according to a different wireless communication standard may thus be provided as a network, which may provide continuous or nearly continuous overlapping service any or all of the to mobile devices 106 and similar devices over a geographic area via one or more wireless communication standards.

Thus, while base station 102 may act as a "serving cell" for a UE 106 as illustrated in FIG. 1, any or all of the mobile devices 106 may also be capable of receiving signals from (and possibly within communication range of) one or more other cells (which might be provided by other base stations (not shown)) and/or wireless local area network (WLAN) access points, which may be referred to as "neighboring cells" or "neighboring WLANs" (e.g., as appropriate), and/or more generally as "neighbors". Further, two or more neighboring coverage areas may overlap to any degree.

Figure 2:
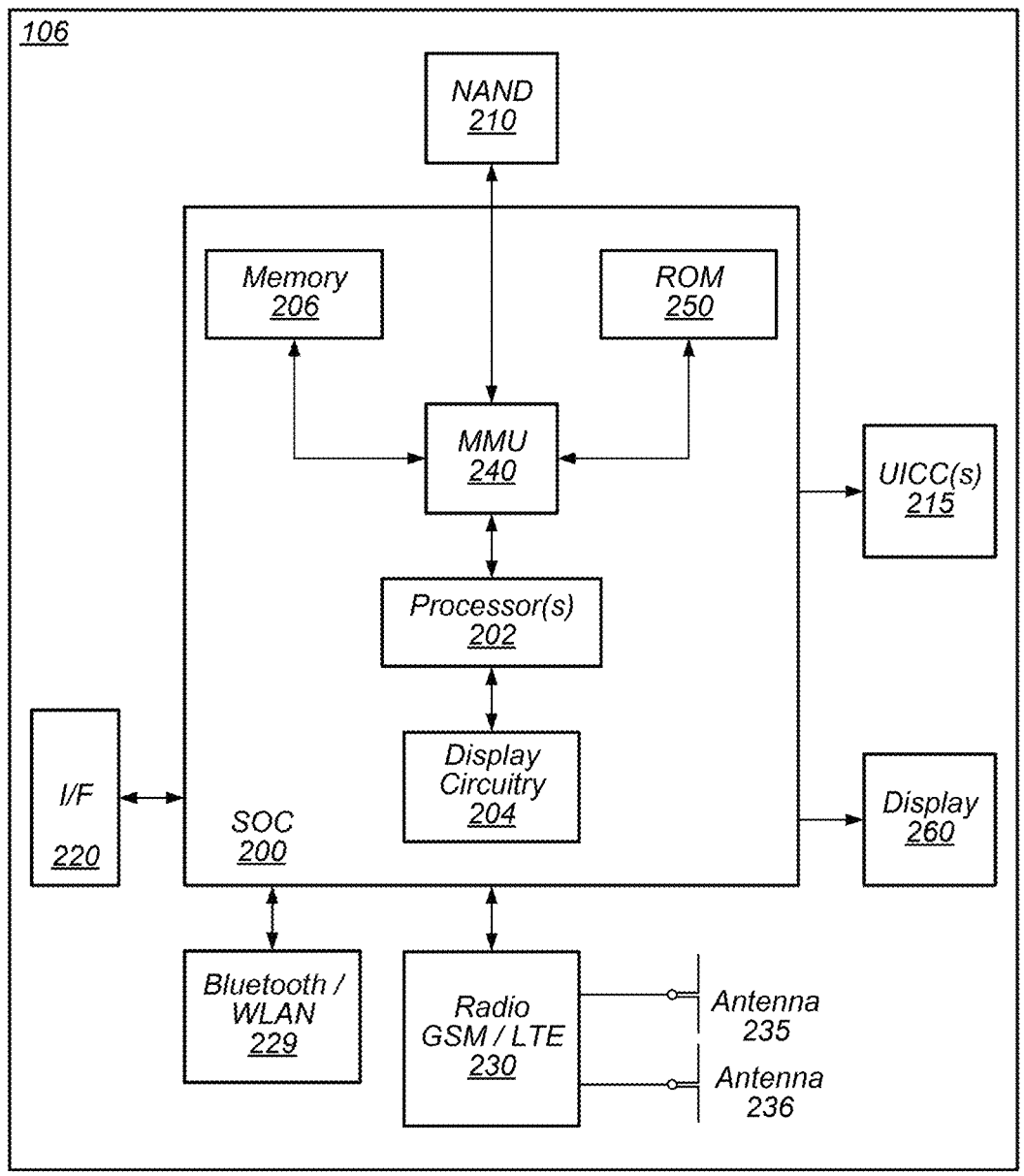
FIG. 2 illustrates an example block diagram of a mobile device.

FIG. 2—Mobile Device Block Diagram

FIG. 2 illustrates an example simplified block diagram of a mobile device 106. As shown, the mobile device 106 may include a system on chip (SOC) 200, which may include portions for various purposes. The SOC 200 may be coupled to various other circuits of the mobile device 106. For example, the mobile device 106 may include various types of memory (e.g., including NAND flash 210), a connector interface 220 (e.g., for coupling to a computer system, dock, charging station, etc.), the display 260, cellular communication circuitry 230 such as for LTE, GSM, etc., and short range wireless communication circuitry 229 (e.g., Bluetooth™ and WLAN circuitry). The mobile device 106 may further include one or more smart cards 215 that provide SIM (Subscriber Identity Module) functionality, such as one or more UICC(s) (Universal Integrated Circuit Card(s)) 215. The cellular communication circuitry 230 may couple to one or more antennas, for example to two antennas 235 and 236 as shown. The short range wireless communication circuitry 229 may also couple to one or both of the antennas 235 and 236 (this connectivity is not shown for ease of illustration).

As shown, the SOC 200 may include processor(s) 202, which may execute program instructions for the mobile device 106 and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, cellular communication circuitry 230, short range wireless communication circuitry 229, connector I/F 220, and/or display 260. The MMU 240 may be configured to perform memory protection and page table translation or set up. In some embodiments, the MMU 240 may be included as a portion of the processor(s) 202.

In one embodiment, as noted above, the mobile device 106 includes at least one smart card 215, such as a UICC 215, which executes one or more Subscriber Identity Module (SIM) applications and/or otherwise implements SIM functionality. The smart card(s) 215 may be only a single smart card 215, or the mobile device 106 may include two or more smart cards 215. Each smart card 215 may be embedded, e.g., may be soldered onto a circuit board in the mobile device 106, or each smart card 215 may be implemented as a removable smart card, an electronic SIM (eSIM), or any combination thereof. Any of various other SIM configurations are also contemplated.

As noted above, the mobile device 106 may be configured to communicate wirelessly using multiple radio access technologies (RATs), e.g., using one or more radios 229, 230. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of a receive and/or transmit chain between multiple wireless communication technologies, such as those discussed above.

The mobile device 106 may be configured to communicate according to a WLAN RAT and/or one or more cellular RATs, e.g., such as communicating on both WLAN and cellular at the same time. For example, the mobile device 106 may be communicating on a primary communication channel (such as WLAN), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 202 of the mobile device 106 may be configured to implement part or all of the features described herein, e.g., by executing program instructions stored on a memory medium (e.g., a non-transitory computer-readable memory medium). Alternatively (or in addition), processor 202 may be configured as a programmable hardware element, such as an FPGA (Field Programmable Gate Array), or as an ASIC (Application Specific Integrated Circuit). Alternatively (or in addition) the processor 202 of the mobile device 106, in conjunction with one or more of the other components 200, 204, 206, 210, 215, 220, 229, 230, 235, 236, 240, 250, 260 may be configured to implement part or all of the features described herein.

Figure 3:
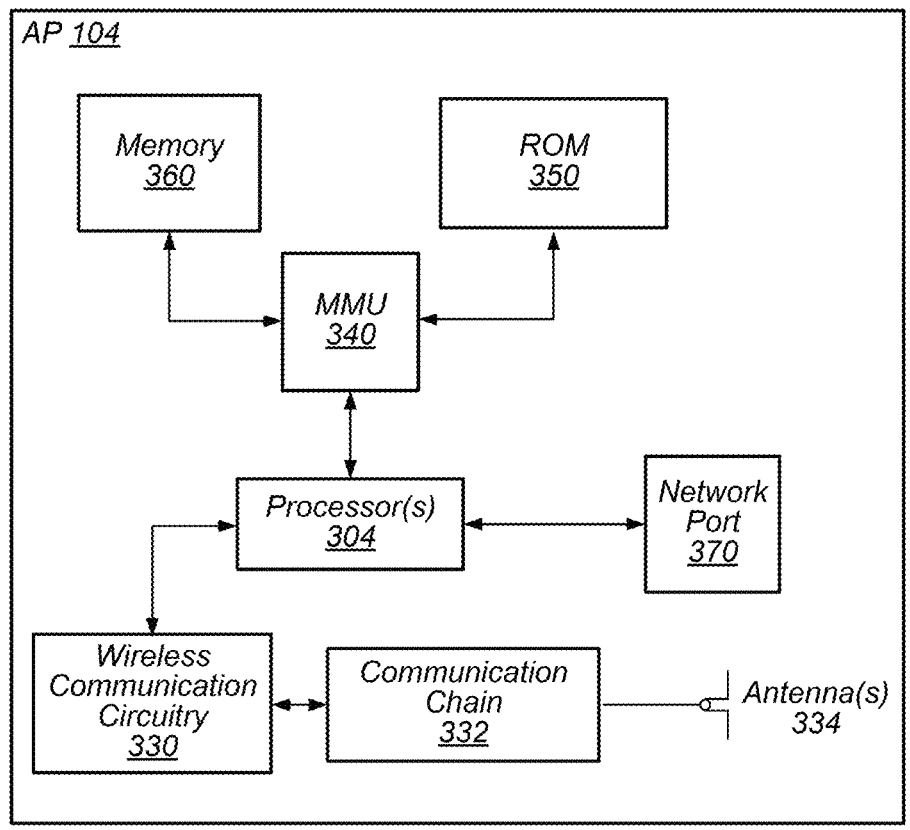
FIG. 3 illustrates an example block diagram of an access point.

FIG. 3—Exemplary Block Diagram of an Access Point

FIG. 3 illustrates an example block diagram of an access point 104. It is noted that the access point 104 of FIG. 3 is merely one example of a possible access point. As shown, the access point 104 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The access point 104 may include at least one network port 370. The network port 370 may be configured to couple to a network, such as the Internet, and provide a plurality of devices, such as mobile devices 106, access to the network as described above in FIG. 1.

The network port 370 (or an additional network port) may also be configured to couple to a cellular network, e.g., a core network of a cellular service provider. The core network may provide mobility related services and/or other services to a plurality of devices, such as mobile devices 106. In some cases, the network port 370 may couple to a telephone network via the core network, and/or the core network may provide a telephone network (e.g., among other mobile devices serviced by the cellular service provider).

The access point 104 may include at least one antenna 334, and possibly multiple antennas. The antenna(s) 334 may be configured to operate as a wireless transceiver and may be further configured to communicate with mobile devices 106 via radio 330. The antenna(s) 334 communicates with the wireless communication circuitry 330 via communication chain 332. Communication chain 332 may be a receive chain, a transmit chain or both. The radio 330 may be configured to communicate via various wireless local area network standards, including, but not limited to WLAN.

The block diagram of FIG. 3 may also apply to cellular base station 102, except that communication may be performed using any of various cellular communication technologies instead of or in addition to WLAN.

FIG. 4—Flowchart

In order to support further deployment and usage as WLANs become more widespread (e.g., both in cellular-WLAN interworking deployments and standalone WLAN deployments, among various possible deployment scenarios), increasing WLAN communication capacity (e.g., in terms of increasing throughput, user capacity, etc.) and flexibility is an important consideration. One possible technique in support of this consideration may include introducing multi-user frame transmissions. Among the possible ways of providing such a multiple access feature, one possible technique may include utilizing transmit beamforming to generate orthogonal user signatures for the respective receiving devices, such that a single physical protocol data unit (PPDU) frame can be addressed to multiple users. However, this feature may require multiple antennas to provide beamforming capability.

Figure 4:
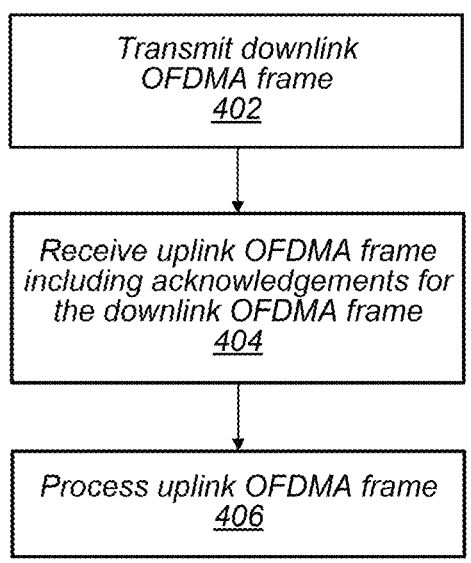
FIG. 4 is a flowchart diagram illustrating an exemplary method for performing OFDMA communication in a WLAN.

As another possibility, orthogonal frequency division multiple access (OFDMA) may be used as a technique supporting simultaneous transmissions to and/or from different devices, even for single antenna devices. FIG. 4 is a flowchart diagram illustrating an example method for performing OFDMA communication in a WLAN, according to some embodiments. Aspects of the method of FIG. 4 may be implemented by a cellular base station, Wi-Fi access point, wireless user equipment device, or more generally in conjunction with any of the computer systems or devices shown in the above Figures, among other devices, as desired.

In various embodiments, any of the elements of the method described may be performed concurrently, in a different order than described, may be substituted for by other method elements, or may be omitted. Additional method elements may also be performed as desired. As shown, the method may operate as follows.

A first device may transmit a downlink OFDMA frame (402). The downlink OFDMA frame may include one or more packets intended for each of (possibly) multiple receiving devices.

The downlink OFDMA frame may have a certain total bandwidth, in some embodiments. As one possibility, the bandwidth may be a multiple of 20 MHz (e.g., 40 MHz, 60 MHz, 80 MHz, etc.), or subbands smaller than 20 MHz. For example, the first frame may include a number of 20 MHz channels or subbands (e.g., each having a 20 MHz transmit mask with guard bands between the channels) selected based on a number of destination stations for the first frame, an amount of data to be transmitted in the first frame, and/or any of various other considerations. Other total bandwidths are also possible.

Additionally, the total bandwidth may be allocated to the various receiving devices, e.g., such that each packet is provided to its destination device on a particular channel or portion of the total bandwidth. For example, following the above-described scenario in which the total bandwidth includes a number of fixed bandwidth (e.g., 20 MHz) channels, certain channel(s) may be intended for certain receiving device(s). The destination/intended recipient of the packet provided on each channel/subband of the total bandwidth may be indicated in conjunction with the downlink OFDMA packet, for example by including a destination device identifier, such as a partial association ID (PAID), or any other format of STA ID, of the destination device, in the PHY preamble of the downlink OFDMA frame on a per channel/subband basis, as one possibility. Note that in such a scenario, multiple channels/subbands of the total bandwidth (which may not necessarily be continuous in frequency) may be allocated to a single destination device, if desired. Other frameworks for indicating which bandwidth portions (including frameworks in which dynamic/non-fixed bandwidth allocations are possible) are allocated to which receiving devices are also possible.

At least in some embodiments, if the data/payload lengths are different for different bandwidth portions of the downlink OFDMA frame (e.g., for different users/destination devices), padding (e.g., zeros appended to the data) may be added to some or all of the data portions such that signals on all bandwidth portions of the total bandwidth are completed simultaneously or substantially simultaneously. For example, a desired packet length (such as a packet length associated with the packet to be transmitted that has the longest payload portion) of each packet included in the downlink OFDMA frame may be determined, and the payload of any packets less than that length may be padded to match the desired packet length.

In response to the downlink OFDMA frame, each respective recipient of the intended recipients of the downlink OFDMA frame may transmit acknowledgement information (e.g., indicating successful reception) if the data for the respective recipient is successfully received and decoded. The first device may accordingly receive acknowledgement information from the recipient devices in response to the downlink OFDMA frame (404).

The acknowledgement information may be received concurrently by the first device as an uplink OFDMA frame. For example, as noted above, by matching the length of the packets transmitted as part of the downlink OFDMA frame, the signals transmitted on the various portions (e.g., channels) of the downlink OFDMA frame may terminate in a time synchronized manner, and this time synchronization may in turn facilitate/coordinate potential time synchronous reception of acknowledgement information from the various devices receiving the downlink OFDMA frame, such that the acknowledgement information may effectively be received as an uplink OFDMA frame.

The first device may process the acknowledgement information (e.g., in parallel, or serially if desired) received to determine which of the receiving devices transmitted acknowledgements (406). At least in some instances, each receiving device may provide an acknowledgement (if successful at decoding its packet(s)) using the same bandwidth portion on which the packet(s) being acknowledged was/were received. It is also possible that a receiving device that was allocated multiple channels or bandwidth portions may choose to provide an acknowledgement on a subset of the bandwidth allocated to it for the first frame; for example, a device allocated multiple 20 MHz channels might provide an acknowledgement for all of its allocated channels using just one of those channels or fewer than all allocated channels.

Timing alignment for the uplink OFDMA frame may be sufficiently provided for by the packet length matching of the downlink OFDMA frame and by receiving devices using a consistent and predictable time interval (e.g., a short interframe space (SIFS)) between packet reception and acknowledgement transmission, at least in some embodiments. Accordingly, the first device may be able to perform carrier sensing to detect the uplink OFDMA frame using autocorrelation over the total bandwidth of the uplink OFDMA frame (which may be the same as the total bandwidth of the downlink OFDMA frame, e.g., if acknowledgements are transmitted using the same bandwidth portions as are used in the downlink OFDMA frame). Automatic gain control (AGC) may also be set based on such autocorrelation over the total bandwidth, in some embodiments.

Techniques may also be implemented to estimate and correct the potentially different frequency offsets of different receiving devices as part of processing the acknowledgement information. For example, as one possibility, coarse carrier frequency offset (CFO) estimation and correction may be performed over the total bandwidth of the uplink OFDMA frame, e.g., using the legacy short training field (L-STF) of the uplink OFDMA frame. Subsequently, the various portions (e.g., channels/subbands) of the total bandwidth may be separated out, for example, using Fourier transform techniques. Fine CFO estimation and correction may then be performed separately for each of multiple portions (e.g., for each portion associated with a different receiving device) of the total bandwidth of the uplink OFDMA frame, e.g., using the legacy long training field (L-LTF) of the uplink OFDMA frame. Based on such channel and CFO estimation and correction, the first device may then perform tone mapping, deinterleaving, and decoding of any remaining PHY preamble fields (e.g., L-SIG) and the payload (e.g., acknowledgement information) for each of the multiple portions of the total bandwidth of the uplink OFDMA frame.

FIGS. 5-13

FIGS. 5-13 and the information provided herein below in conjunction therewith are provided by way of example of various considerations and details relating to possible systems in which the method of FIG. 4 and/or other aspects of this disclosure may be implemented, and are not intended to be limiting to the disclosure as a whole. Numerous variations and alternatives to the details provided herein below are possible and should be considered within the scope of the disclosure.

IEEE 802.11 is a set of media access control (MAC) and physical layer (PHY) specifications for implementing WLAN communication. 802.11ac introduced a new feature for downlink multi-user frame transmissions (downlink MU-MIMO) where frames addressed to several users (up to a maximum of 4) may be transmitted simultaneously in a single PPDU frame. Based on transmit beam forming, orthogonal user signatures are generated by the transmitting device using multiple antennas. However, this feature cannot be enabled if the transmitter has a single antenna.

Orthogonal Frequency Division Multiple Access (OFDMA) may be useful in optimizing bandwidth use for WLAN communication. OFDMA may be useful for transmitters having a single antenna, e.g., allowing simultaneous transmissions to/from different users even if the transmitting device is a single antenna device.

In some embodiments, downlink OFDMA may be implemented and may be indicated by using one or more bits in a PHY signal field and/or using a trigger frame, among other possibilities. For example, a new bit in the PHY signal field may indicate that the current frame is being transmitted in OFDMA mode. Additionally, an OFDMA PHY structure may be implemented for handling communications to and/or from multiple recipients.

Figure 5:
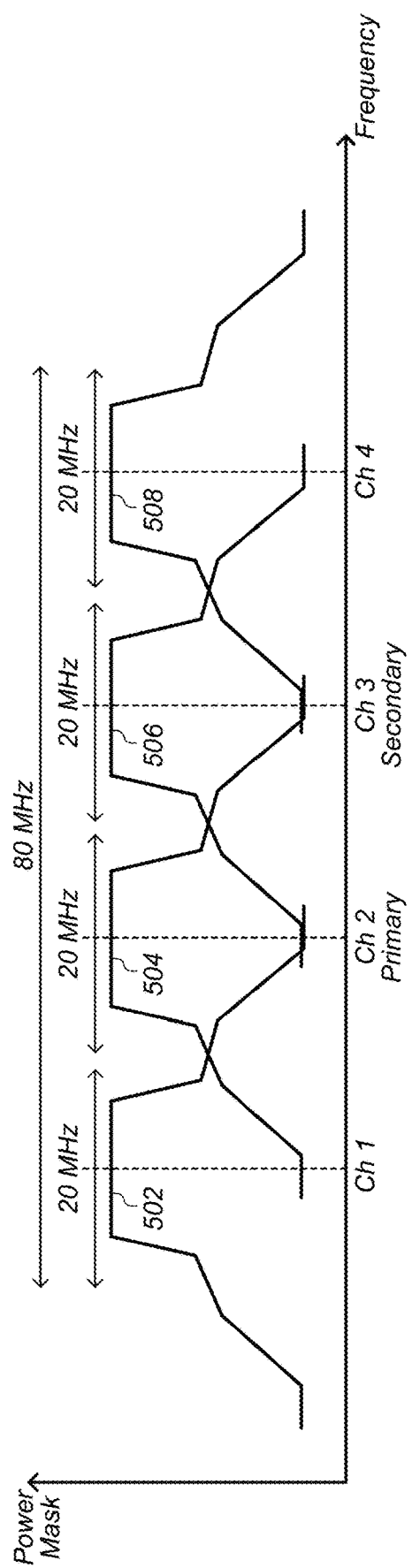
FIG. 5 illustrates an example spectral transmit mask configuration for WLAN OFDMA communication.

In some embodiments, as shown in FIG. 5, the OFDMA mode may operate in units of 20 MHz (e.g., resource block size=20 MHz) with 20 MHz spectral transmit mask. However, it should be noted that the 20 MHz size is exemplary only, and others are envisioned, such as 2.5, 5, 10, 15, 30, 40, 60, 80, 100, or other values. The total bandwidth in this example is shown as 80 MHz (e.g., including four 20 MHz channels 502, 504, 506, 508), although other values of the total bandwidth are also envisioned.

OFDMA may also be implemented in the uplink in WLANs. For example, each receiving device (e.g., mobile devices) may provide acknowledgements back to the transmitting device (e.g., the AP) as a response to downlink packets. Note that while various embodiments may be particularly useful where an AP transmits to a plurality of mobile devices, situations where a mobile device transmits to multiple mobile devices and/or the AP are also envisioned.

In some embodiments, in order to ensure that acknowledgements from the receiving devices are transmitted at the same time, the OFDMA packets originally sent to the receiving devices may be the same size. For example, the transmitting device may "pad" the transmitted packets (e.g., with "0"s or some other sequence of bits) in order to ensure that all the packets are the same size (e.g., padding each payload to the size of the largest payload in the group). By ensuring the same size, time synchronization of the acknowledgements may be achieved.

In addition to addressing the time synchronization, a frequency offset estimation and correction algorithm for uplink OFDMA may be implemented by the device which is receiving the acknowledgements from the multiple devices simultaneously.

Figure 6:
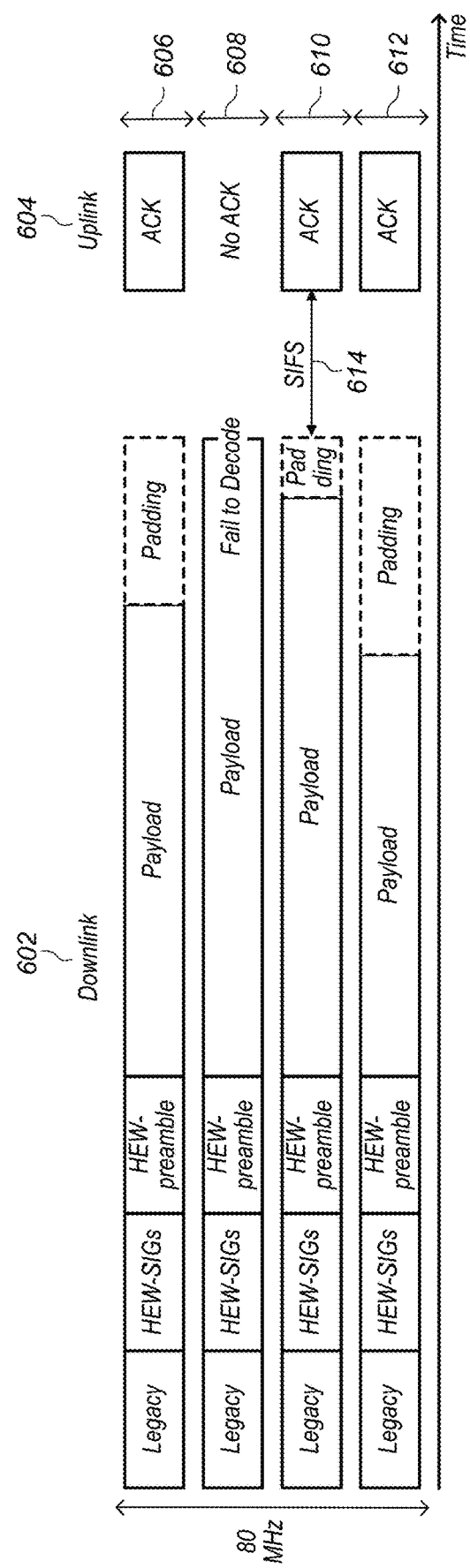
FIG. 6 is a frequency/time diagram of an example downlink and uplink WLAN OFDMA transmission.

FIG. 6 illustrates a frequency/time diagram of an example transmission in the downlink 602 and acknowledgement in the uplink 604. In this instance, the device assigned to the second band 608 has the longest payload, and has no additional padding. The payloads of the first band 606, third band 610, and fourth band 612 are padded to match the size of the second band's payload. The transmitted packets may include legacy, HEW-SIG, and HEW preamble fields, according to some embodiments. After a SIFS 614, the receiving devices that successfully decoded the transmitted packets (in this instance, the first, second, and fourth receiving devices) transmit acknowledgements to the transmitting device.

In this example, the downlink OFDMA transmission 602 is performed as a unit of 20 MHz bands per user. However, as noted above, this band size could be smaller or larger than 20 MHz (scalable), as desired. The uplink OFDMA packets (ACKs) 604 may keep the same bandwidth as responses, or operate in different size of bandwidth, e.g., that may be dynamically assigned by the transmitting device. As noted above, if the packet length is different per user, some or all of the packets may be padded (e.g., with zeros) such that the transmissions have the same length. Upon reception of a downlink OFDMA packet, each recipient may send back an ACK after the SIFS 614, e.g., using the same band of operation. If the packet reception fails, the recipient may not send an ACK. In general, the ACKs may be sent at the same time, e.g., upon expiration of the SIFS 614 after the end of the received OFDMA packet 602. Note that if signals are sent simultaneously or nearly simultaneously to a STA on more than one 20 MHz band, the STA may send an ACK on any or all of the separate 20 MHz bands used.

Figure 7:
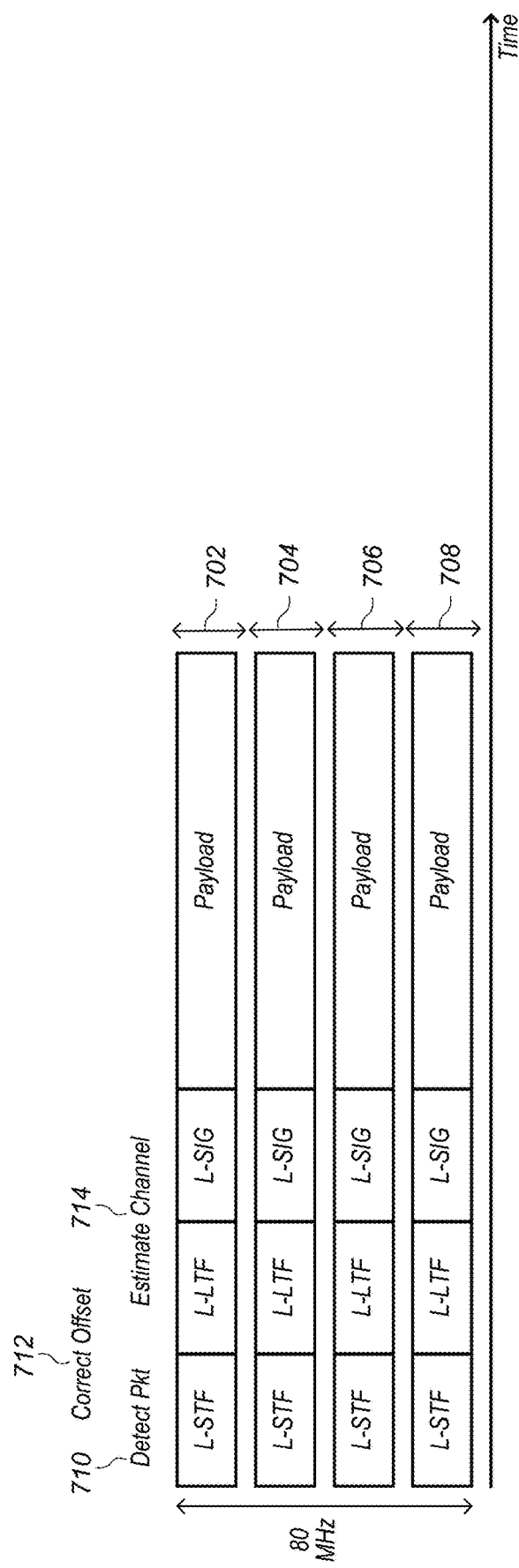
FIG. 7 is a frequency/time diagram of an example uplink (acknowledgement) WLAN OFDMA transmission.

FIG. 7 illustrates an exemplary time/frequency diagram of the acknowledgements. In this example, the transmitter (e.g., the AP) may expect to receive ACKs for each of the 20 MHz bands 702, 704, 706, 708 after a SIFS interval following the end of a downlink OFDMA packet. The legacy portions of preamble may be identical and arrive simultaneously within the cyclic prefix (CP) period. The total BW of ACKs may be the same as with the BW of the downlink OFDMA packet, therefore the transmitter may know which BW filter to use (e.g., in this example, 80 MHz). The packet detection and processing of the preamble is discussed in more detail below.

Processing the L-STF may involve single processing over the total BW. Using auto-correlation over the total BW, the transmitting device receiving the acknowledgements may perform CS (carrier sense) for packet detection 710 and set AGC (automatic gain control). In one embodiment, within 8 usec (e.g., the length of two OFDM symbols), the transmitting device receiving the acknowledgements may turn on Fast Fourier Transform (FFT) and Carrier Frequency Offset (CFO) modules.

Processing the L-LTF may involve single processing for channel estimation and parallel processing for CFO estimation and correction. In one embodiment, 256 FFT (64×4 for 80 MHz) may be performed to separate out each 20 MHz band. CFO estimation and correction 712 may be processed for each 20 MHz band. Additionally, channel estimation 714 may be performed for each 20 MHz band. The transmitting device receiving the acknowledgements may identify which 20 MHz band is empty (i.e., where no ACKs were received).

Processing the L-SIG and payload may involve parallel processing of the data, e.g., per 20 MHz band. In some embodiments, any or all of tone mapping, deinterleaving, and decoding can be performed, e.g., per 20 MHz band.

Figure 8:
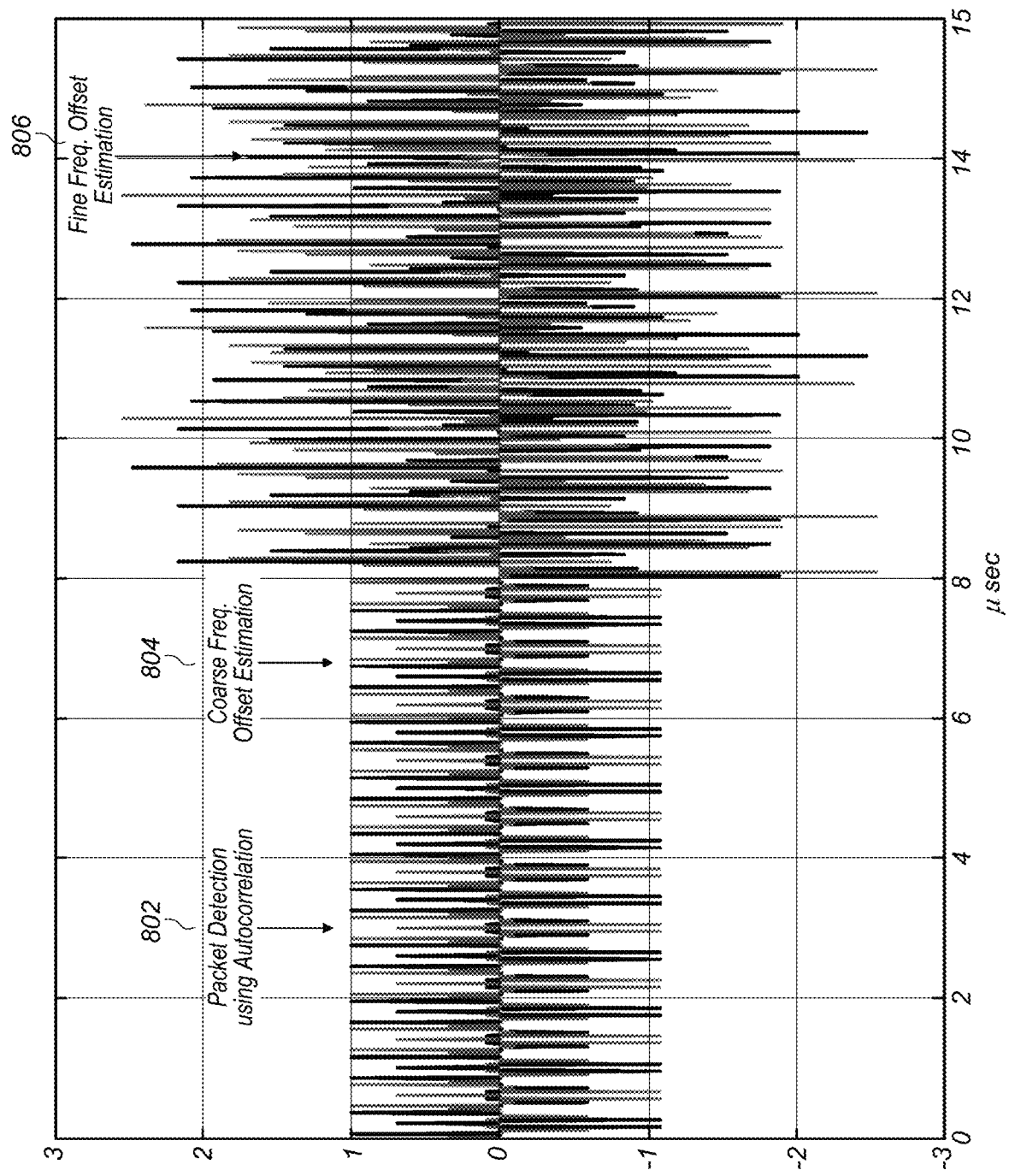
FIG. 8 illustrates an example waveform related to preamble processing of an uplink WLAN OFDMA packet.

FIG. 8 illustrates a waveform diagram related to preamble processing of an UL-OFDMA packet. The packet arrival time is well synchronized with the SIFS time interval (e.g., due to padding discussed above). Accordingly, it is possible to detect the packet using autocorrelation 802. Estimating and/or correcting the frequency offset (including coarse frequency offset estimation 804 and fine frequency offset estimation 806) may also be performed, as the frequency offset can differ per user.

Figure 9A:
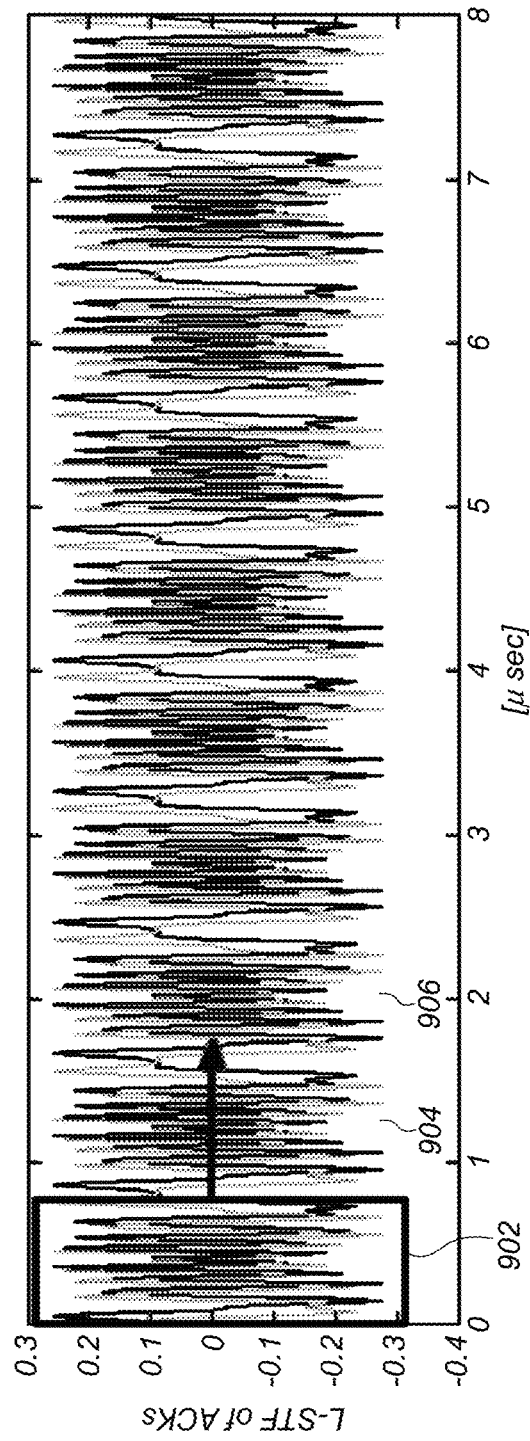
FIGS. 9A-9B illustrate example autocorrelation performed at the L-STF portion of an uplink WLAN OFDMA packet.
Figure 9B:
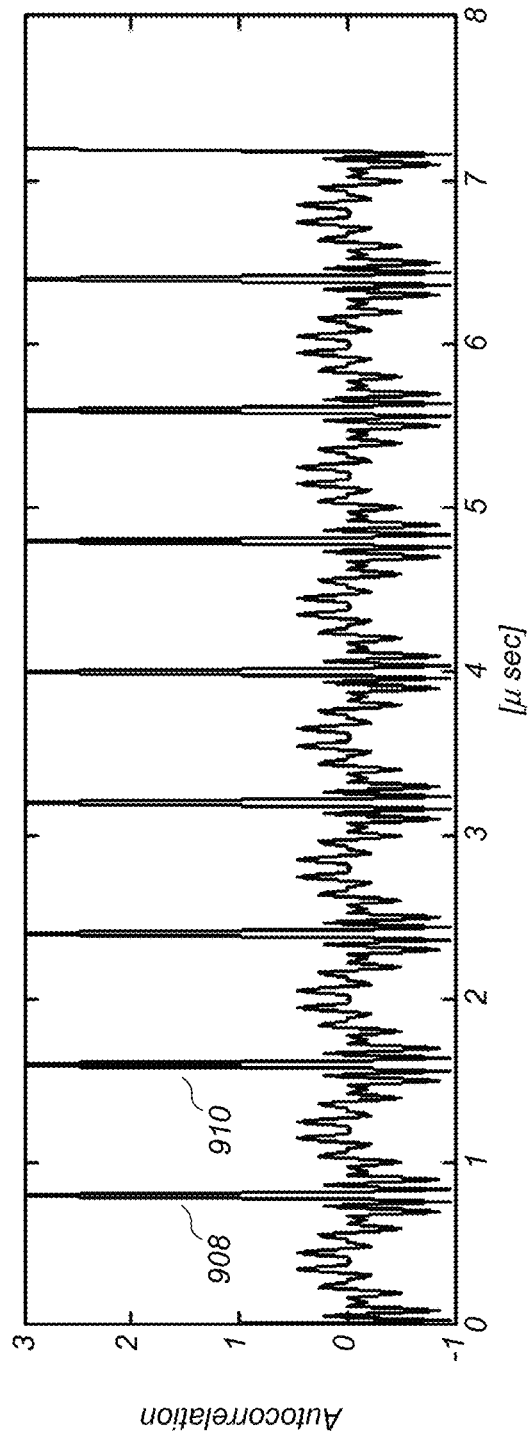

FIGS. 9A-B illustrate autocorrelation performed at the L-STF portion. In particular, FIG. 9A illustrates an example of possible L-STF signals of an acknowledgement UL-OFDMA frame, while FIG. 9B illustrates autocorrelation results for the L-STF signals of FIG. 9A. Within the SIFS period following a downlink OFDMA packet, the transmitting device may expect to receive multiple ACKs at different frequency bands; however, it may not know which STAs will send an ACK (e.g., which mobile devices successfully decoded the transmission and transmitted acknowledgements). The transmitting device may collect the first 0.8 usec of samples and perform auto-correlation. If it shows repeated pattern (such as illustrated in FIG. 9A, e.g., 902, 904, 906, etc.), the transmitting device (e.g., the AP) is receiving ACKs. Although some ACKs may be missing at some frequency bands (e.g., an ACK is missing at the third frequency band in the example of FIGS. 9A-B), L-STFs will still show a repeated autocorrelation pattern (such as illustrated in FIG. 9B, e.g., including peaks 908, 910, etc.) if other ACKs are present. Note that if extra memory is available at the transmitting device, it may be configured to recognize in which frequency bands an ACK is missing by performing cross-checks of the L-STF pattern(s), e.g., against all possible L-STF patterns.

After a packet is detected, a frequency offset may be estimated and corrected. The CFO estimation range may be limited by the length of the repeated sequence. More specifically, the estimation range may be inversely proportional to the sequence length. The L-STF sequence may have a length of 0.8 us and the L-LTF sequence may have a length of 3.2 us, according to some embodiments. Thus, estimation using the L-STF sequence may have a larger range (625 kHz) but a shorter period (Ns). Accordingly, the L-STF estimation can provide lower accuracy (e.g., a coarse estimate). Estimation using the L-LTF sequence has a shorter range (156.2 kHz) but a longer period (Ns). Thus, the L-LTF estimation can provide higher accuracy (e.g., a fine estimate).

Coarse CFO estimation/correction may be performed over the last two L-STF sequences of the 80 MHz time domain signal. The correction may be performed over the full 80 MHz time domain signal.

Fine CFO estimation/correction may be performed in the frequency domain over the L-LTF. Correction may be performed in the time domain separately for each 20 MHz band. Fine CFO estimation/correction may be used in addition to coarse CFO estimation/correction to estimate/correct residual CFO estimation error for each 20 MHz signal, e.g., due to the differing CFOs of different STAs.

Figure 10:
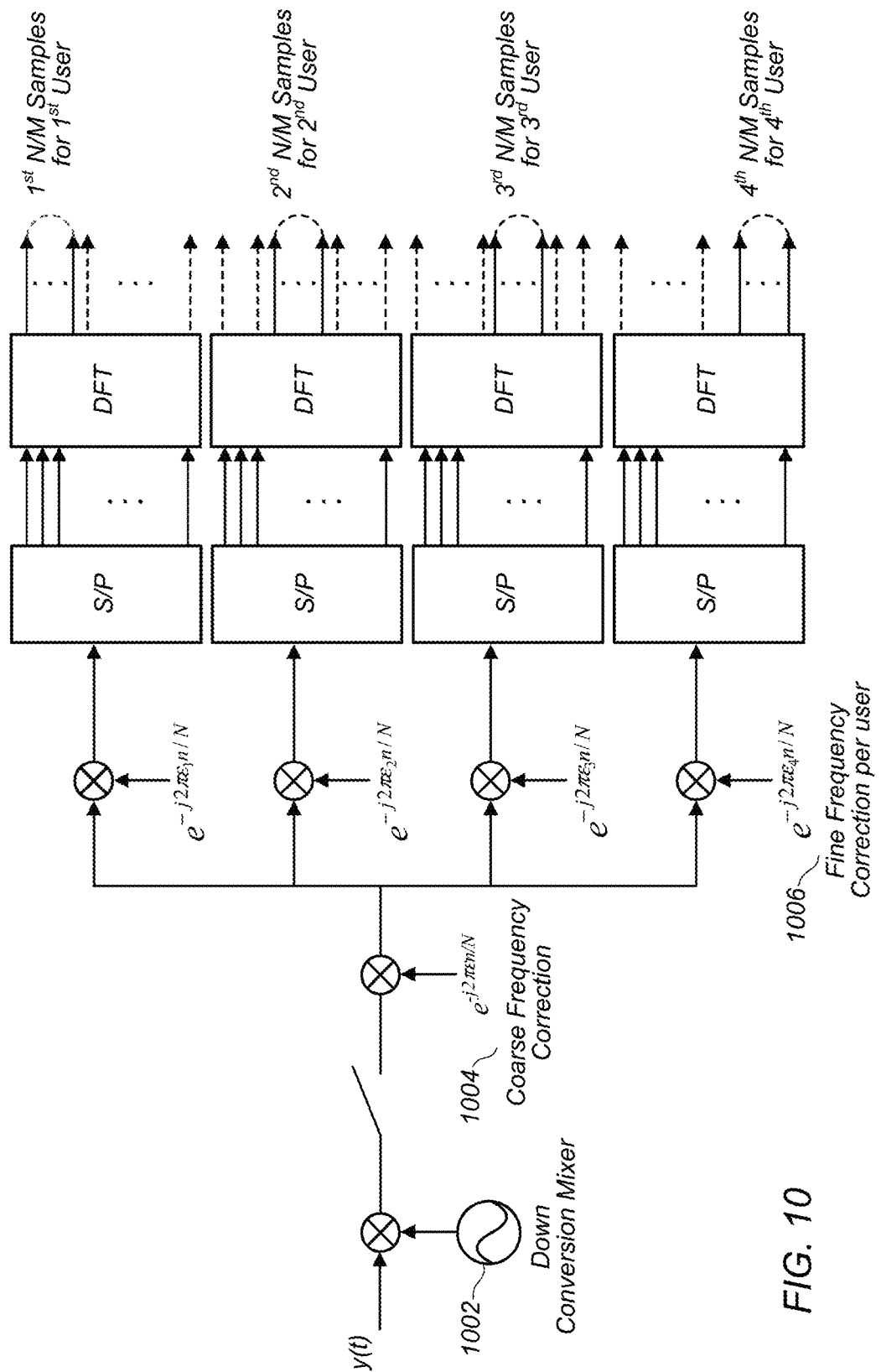
FIG. 10 illustrates an example frequency offset and correction per user configuration for uplink WLAN OFDMA communication.

FIG. 10 illustrates frequency offset estimation and correction per user. Down conversion 1002 may be performed to remove the carrier frequency (2.4 GHz or 5 GHz). Coarse Frequency Correction 1004 may apply the values estimated using the last two L-STF fields, e.g., using the following equation:

$$e^{-j2\pi \varepsilon n/N}$$

where:
M: The number of users (4 in this example)
N: The total number of FFT size (256 in this example)
$Y_{j,k}$: received samples at jth OFDM symbol at kth tone
$\varepsilon_i$: estimated frequency offset for ith user:

$$\hat{\varepsilon}_i = \frac{1}{2\pi}\tan^{-1}\left[\frac{\sum_{k=(i-1)N/M}^{\frac{iN}{M}}\operatorname{Im}(Y_{2,k}Y_{1,k}^*)}{\sum_{k=(i-1)N/M}^{\frac{iN}{M}-1}\operatorname{Re}(Y_{2,k}Y_{1,k}^*)}\right] = \frac{1}{2\pi}\arg\left(\sum_{k=(i-1)N/M}^{\frac{iN}{M}-1}(Y_{2,k}Y_{1,k}^*)\right)$$

Fine Frequency Correction 1006 may apply residual offset values, which can be estimated per band, using two L-LTF fields, e.g., using the following equation:

$$e^{-j2\pi \varepsilon_i n/N}$$

Figure 11:
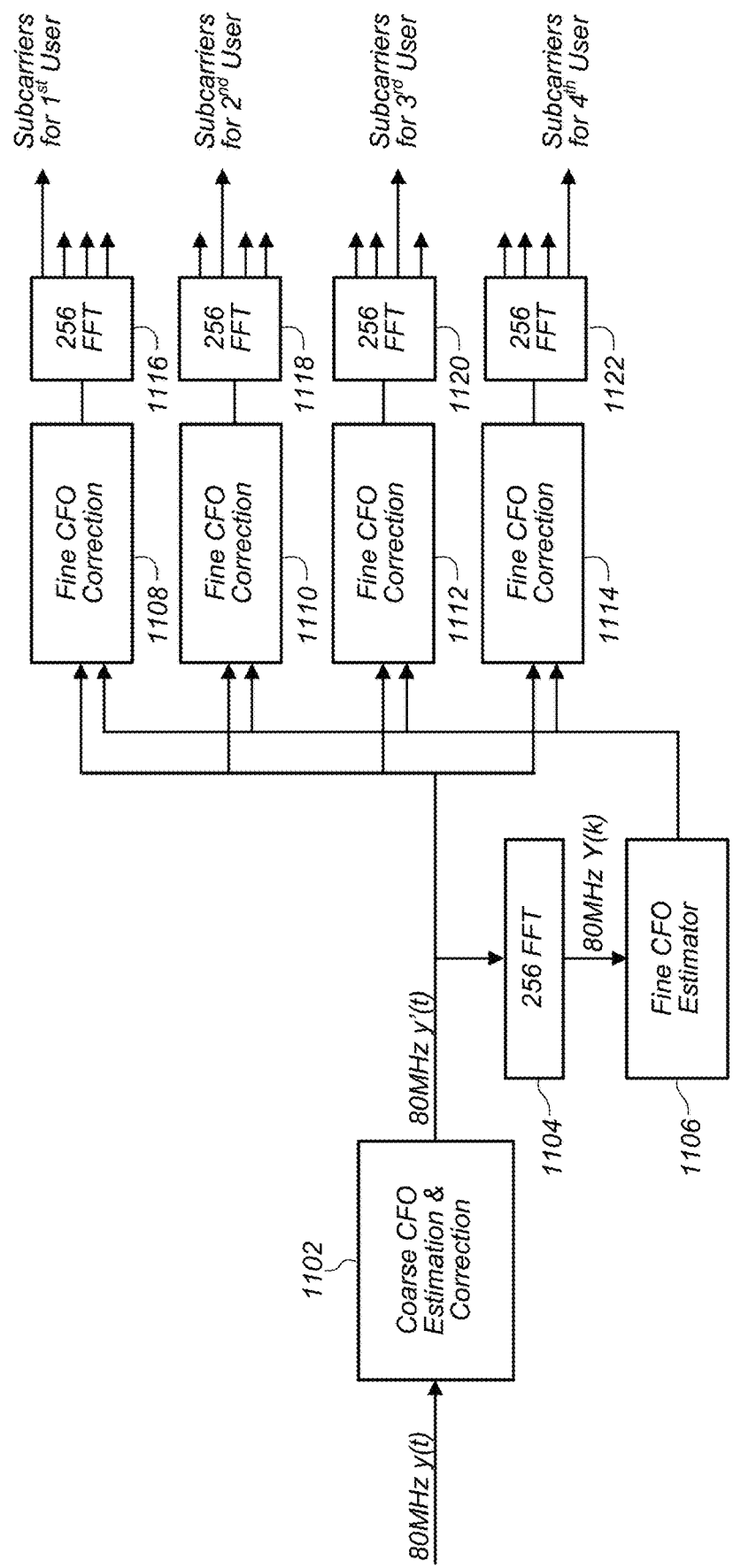
FIG. 11 illustrates an example logical block diagram for CFO estimation uplink WLAN OFDMA communication.

FIG. 11 illustrates a logical block diagram for CFO estimation in an example scenario with an 80 MHz signal bandwidth including four 20 MHz channels, each allocated to a different user. As shown, coarse CFO estimation and correction (1102) may be applied over the total bandwidth. 256 FFT (1104) and fine CFO estimation (1106) may then be followed by fine CFO correction (1108, 1110, 1112, 1114) on a per-user basis. Per-user 256 FFT (1116, 1118, 1120, 1122) may then be applied and the subcarriers for each user may be processed. It is noted that processing can be modified in some implementations, e.g., by using a different FFT size or by performing additional/different operations.

Figure 12:
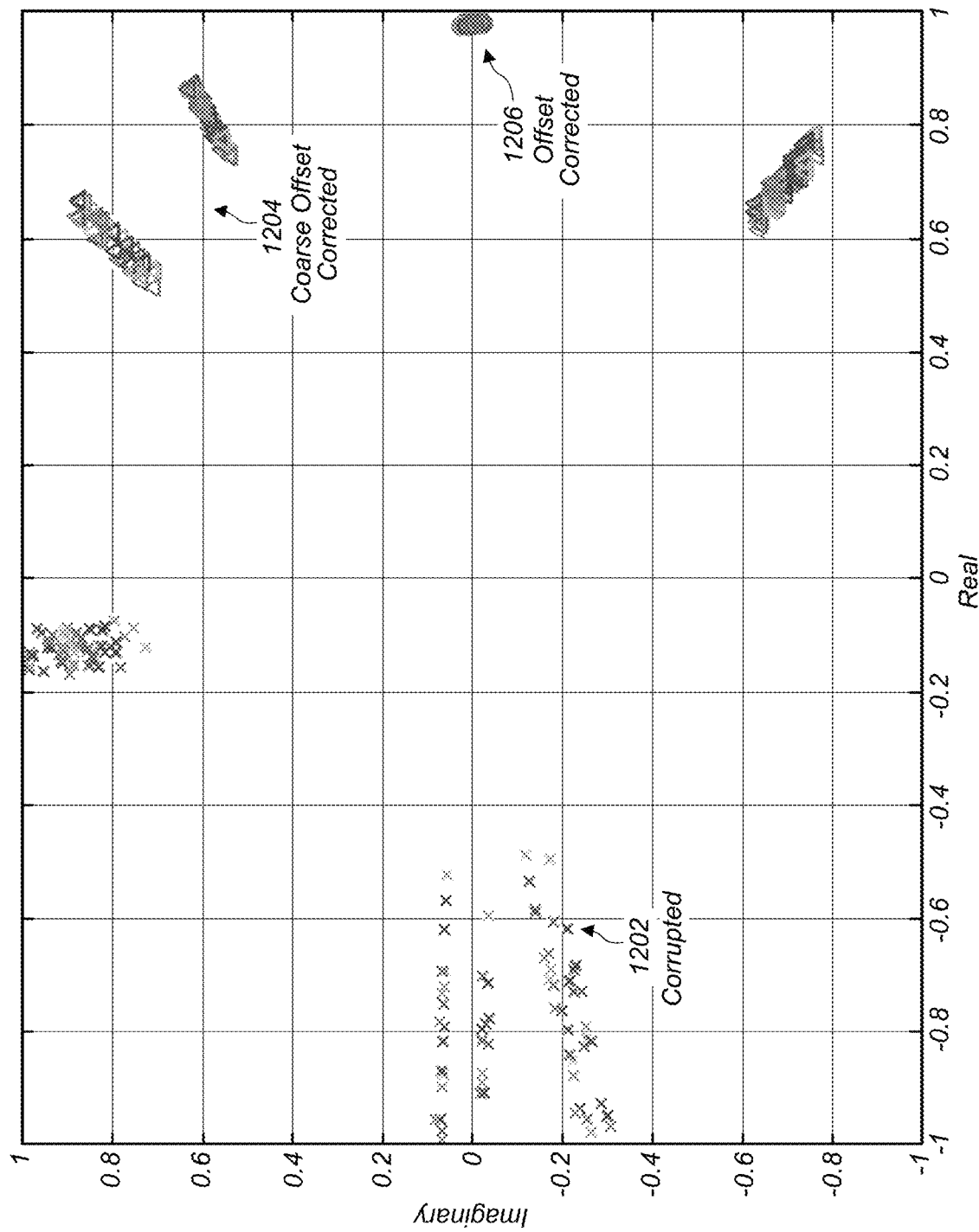
FIG. 12 illustrates an example of possible frequency offset correction results for a BPSK uplink WLAN OFDMA communication.

FIG. 12 illustrates an example of frequency offset correction for binary phase shift keying (BPSK) modulation in which H=1. In this example, samples having randomized phase due to frequency offset per user 1202 are corrected using L-STF (coarse offset corrected 1204) then L-LTF (offset corrected 1206) in a manner similar to that discussed herein above. The plot of FIG. 12 illustrates results.

Figure 13:
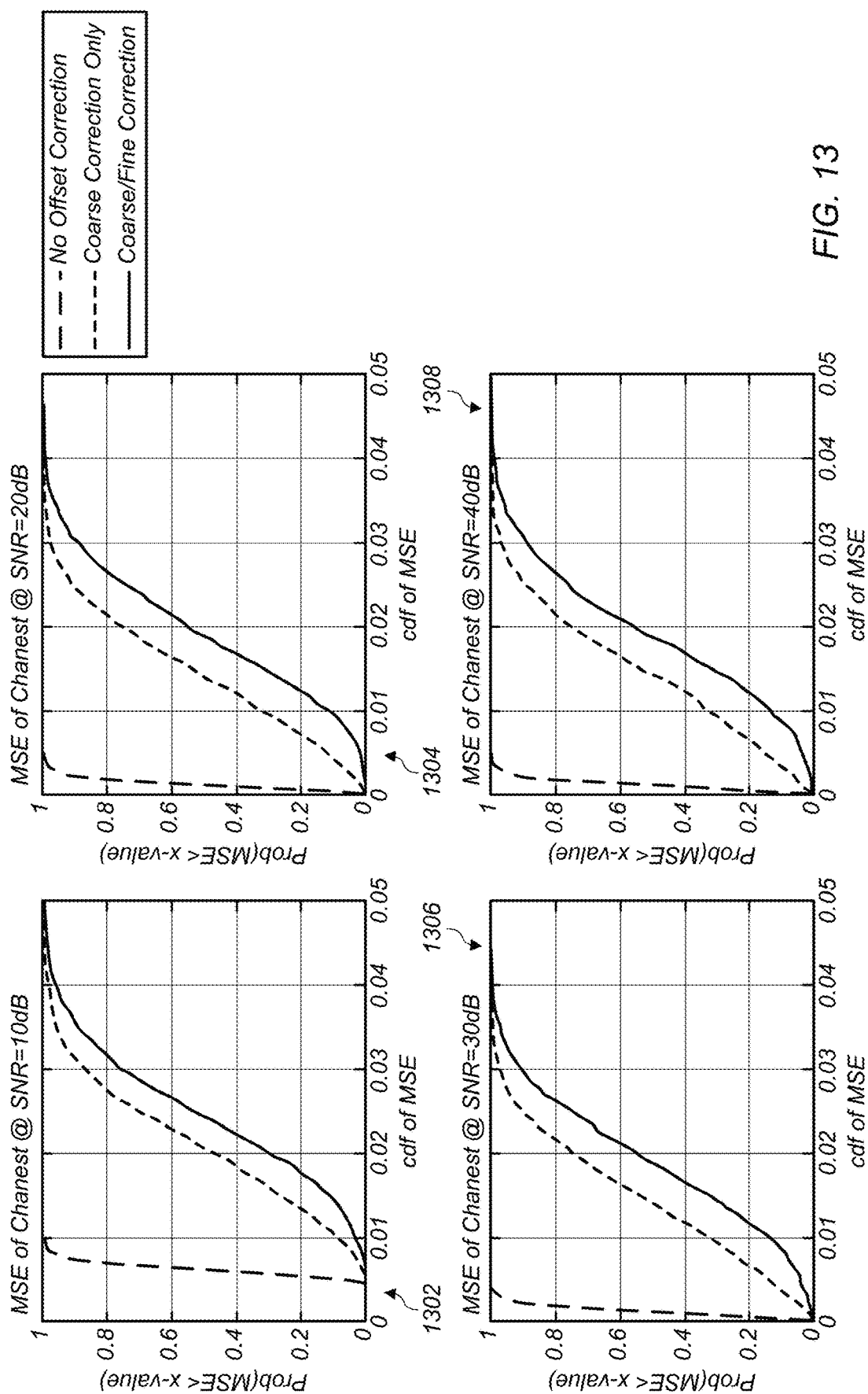
FIG. 13 illustrates example CDF plots of channel estimation with frequency offset correction for uplink WLAN OFDMA communication.

FIG. 13 illustrates example cumulative distribution function (CDF) plots of channel estimation with frequency offset correction. In these examples, frequency offsets from four users are randomized uniformly in [−20, 20] ppm. Frequency offsets may be estimated and the correction is applied differently in each band per user. The graphs of FIG. 13 illustrate operating results. As shown, there are CDF plots at each of various signal to noise ratios (SNRs), including 10 dB 1302, 20 dB 1304, 30 dB 1306, and 40 dB 1308.

In the following further exemplary embodiments are provided.

One set of embodiments may include a method for performing OFDMA communication in a WLAN, including: at a transmitting device: transmitting first information to multiple receiving devices over the WLAN indicating that a current frame is an OFDMA frame; transmitting second information to each of the multiple receiving devices indicating respective channel information regarding one or more channels of the WLAN bandwidth associated with the respective receiving device; transmitting data to each of the multiple receiving devices according to the channel information comprised in the second information.

According to some embodiments, the transmitting device includes an access point.

According to some embodiments, the first information is included in the current frame in the signal field.

According to some embodiments, the first information is included in a separate frame that is sent in advance.

According to some embodiments, the signal field indicates modulation and coding information.

According to some embodiments, the signal field indicates allocated bandwidth information.

According to some embodiments, the signal field includes information identifying the respective device.

According to some embodiments, the information identifying the respective device includes a partial association ID (PAID) or other format of STA ID.

A further set of embodiments may include a transmitting device, configured to perform the method of any of the preceding examples, including: at least one antenna; a first radio, wherein the first radio is configured to perform WLAN communication with the plurality of receiving devices; and at least one processor coupled to the first radios.

A still further set of embodiments may include a non-transitory, computer accessible memory medium storing program instructions executable to perform a method according to any of the preceding examples.

Yet another set of embodiments may include a method for performing OFDMA communication in a WLAN, including: at a transmitting device: determining a desired packet length for a transmission to multiple receiving devices; generating a packet for each of the multiple receiving devices having the desired packet length; concurrently transmitting the plurality of packets to the receiving devices using OFDMA; and receiving information including a plurality of acknowledgements from the receiving devices corresponding to the plurality of packets transmitted to the receiving devices, wherein the plurality of acknowledgements were transmitted concurrently; and processing the information to determine which of the receiving devices transmitted acknowledgements.

According to some embodiments, generating the packet includes padding a plurality of packets to match the desired packet length.

According to some embodiments, padding the plurality of packets comprises adding 0s to the data to match the desired packet length.

Embodiments of the present application may be realized in any of various forms. For example, various described embodiments may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor operably configured to cause a non-access point station (STA) to:
receive, from an access point device, a downlink orthogonal frequency division multiple access (OFDMA) frame;
determine, based on the downlink OFDMA frame, a dynamic uplink bandwidth allocation for the STA;
determine, based on whether the downlink OFDMA frame was successfully received, acknowledgement information responsive to the downlink OFDMA frame;
delay for a short interframe space (SIFS); and
after the SIFS, transmit, to the access point device and using the dynamic uplink bandwidth allocation for the STA, an uplink transmission comprising the acknowledgement information responsive to the downlink OFDMA frame, wherein the uplink transmission is synchronized with a second uplink transmission comprising second acknowledgement information responsive to the downlink OFDMA frame transmitted by a second STA.

2. The apparatus of claim 1, wherein the uplink transmission comprises an uplink OFDMA frame formatted in accordance with an 802.11 protocol.

3. The apparatus of claim 1, wherein:
the downlink OFDMA frame is received on a first bandwidth that is a multiple of 20 MHz; and
to transmit the uplink transmission using the dynamic uplink bandwidth allocation, the processor is further configured to cause the STA to:
assign a transmission bandwidth; and
transmit the uplink transmission on the transmission bandwidth.

4. The apparatus of claim 3, wherein the transmission bandwidth is the same as the first bandwidth.

5. The apparatus of claim 3, wherein the transmission bandwidth is different from the first bandwidth.

6. The apparatus of claim 1, wherein the downlink OFDMA frame comprises a trigger frame.

7. A non-access point station (STA), comprising:
a radio; and
a processor operably coupled to the radio and configured to cause the STA to:
receive, from an access point device, a downlink orthogonal frequency division multiple access (OFDMA) frame;
determine, based on the downlink OFDMA frame, a dynamic uplink bandwidth allocation for the STA;
determine, based on whether the downlink OFDMA frame was successfully received, acknowledgement information responsive to the downlink OFDMA frame;
delay for a short interframe space (SIFS); and
after the SIFS, transmit, to the access point device and using the dynamic uplink bandwidth allocation for the STA, an uplink transmission comprising the acknowledgement information responsive to the downlink OFDMA frame, wherein the uplink transmission is synchronized with a second uplink transmission comprising second acknowledgement information responsive to the downlink OFDMA frame transmitted by a second STA.

8. The STA of claim 7, wherein the uplink transmission comprises an uplink OFDMA frame.

9. The STA of claim 7, wherein:
the downlink OFDMA frame is received on a first bandwidth; and to transmit the uplink transmission using the dynamic uplink bandwidth allocation, the processor is further configured to cause the STA to:
assign a transmission bandwidth; and
transmit the uplink transmission on the transmission bandwidth.

10. The STA of claim 9, wherein the transmission bandwidth is the same as the first bandwidth.

11. The STA of claim 9, wherein the transmission bandwidth is dynamically determined based on the first bandwidth.

12. The STA of claim 7, wherein the downlink OFDMA frame comprises a trigger frame.

13. A method, comprising:
at an access point device:
transmitting, to a plurality of second non-access point stations (STAs), a downlink orthogonal frequency division multiple access (OFDMA) frame indicating respective dynamic uplink bandwidth allocations for respective second devices of the plurality of second STAs; and
after a short interframe space (SIFS), receiving, from a second STA of the plurality of second STAs, an uplink transmission responsive to the downlink OFDMA frame using a corresponding dynamic uplink bandwidth allocation and comprising acknowledgement information based on whether the downlink OFDMA frame was successfully received, wherein the uplink transmission is synchronized with a second uplink transmission comprising second acknowledgement information responsive to the downlink OFDMA frame transmitted by a second STA.

14. The method of claim 13, wherein the uplink transmission comprises an uplink OFDMA frame.

15. The method of claim 13, wherein the downlink OFDMA frame is received on a first bandwidth, and the corresponding dynamic uplink bandwidth allocation is assigned by the access point device.

16. The method of claim 15, wherein the corresponding dynamic bandwidth uplink allocation is the same as the first bandwidth.

17. The method of claim 15, wherein the corresponding dynamic uplink bandwidth allocation is different than the first bandwidth.

* * * * *